United States Patent

[11] 3,579,801

| [72] | Inventor | Frank Y. Ishihara<br>Seattle, Wash. |
|---|---|---|
| [21] | Appl. No. | 717,636 |
| [22] | Filed | Apr. 1, 1968 |
| [45] | Patented | May 25, 1971 |
| [73] | Assignee | Leonard H. Tall<br>Mercer Island, Wash.<br>fractional part interest |

[54] OPENER FOR A FILM PACK
5 Claims, 9 Drawing Figs.

[52] U.S. Cl............................................ 29/427,
29/200, 30/5.5, 30/16, 81/3.32
[51] Int. Cl............................................ B23p 19/04,
B67b 7/30, B25b 27/14
[50] Field of Search....................................29/200 (D),
426, 427; 17/74, 76; 146/2, 13; 30/5.5, 16, 23;
81/3.31, 3.32, 3.39

[56] References Cited
UNITED STATES PATENTS

| 1,400,099 | 12/1921 | Pueppke | 146/13 |
| 2,473,608 | 6/1949 | Plock | 17/74X |
| 2,473,609 | 6/1949 | Plock | 17/74 |
| 2,609,565 | 9/1952 | Mostowicz | 17/76 |
| 2,706,507 | 4/1955 | Bartell | 146/2 |
| 3,110,099 | 11/1963 | Murphy | 29/426 |
| 3,269,870 | 8/1966 | Abramson | 29/427X |
| 3,360,171 | 12/1967 | Richardson | 29/427X |
| 3,364,556 | 1/1968 | Cocce | 29/427X |
| 3,377,687 | 4/1968 | DeChellis | 29/200 |
| 133,500 | 11/1872 | Thomas | 30/5.5 |
| 470,024 | 3/1892 | Welch | 30/5.5 |
| 926,112 | 6/1909 | Gould | 81/3.39X |

*Primary Examiner*—Wayne A. Morse, Jr.
*Attorney*—Thomas W. Secrest

ABSTRACT: This invention is directed to a method and an apparatus for opening a film pack so as to easily and quickly remove the film from the film pack. It is necessary to remove the film from the film pack without damaging the film such as by scratching the undeveloped film or by tearing in two the undeveloped film or by allowing the film to become unraveled from the film pack and generally mixed. I have approached this problem from the standpoint of enlarging the opening in the film pack so that the undeveloped film can be removed from the film pack without substantially touching any of the body of the container of the film pack around the opening.

PATENTED MAY25 1971 3,579,801

INVENTOR.
Frank Y. Ishihara
BY
TWSecrest
ATTORNEYS

PATENTED MAY 25 1971

INVENTOR.
Frank Y. Ishihara

OPENER FOR A FILM PACK

With reference to the drawings, and in particular FIGS. 3-9, it is seen that a film pack 20 comprises a container having sides 22 and 24. Also, there is a top edge 26, a bottom edge 28, a back edge 30 and a front edge 32. In the interior of the container, there is a dividing wall 34 which makes approximately two compartments in the film pack 20.

In the front face 32, there is an opening 36, along one edge of the front wall.

In approximately the central part of the container, there is a lateral shaft 38, and this lateral shaft extends from approximately one wall 22, through an opening in the divider 34 and to approximately the other wall 24. There is a break in the divider 34 so as to allow film to pass from one side of the divider 34 to the other side. Initially, the film is wound on that part of the spindle 38 between the divider 34 and the wall 24. Then, upon exposing the film or taking pictures, the film is passed by the opening 36 in the front wall 32 and wound on that portion of the spindle 38 between the divider 34 and the sidewall 22.

In FIG. 7, it is seen, only partially illustrated, that in the interior of the film pack and between the divider 34 and the wall 22 that there is a circular wall 40. Also, the circular wall 40 near the opening 36 connects with a wall 42 which on its lower end expands into, in a cross-sectional view, a generally rectangular portion 44, and on its upper end expands into, in a cross-sectional view, a rectangular portion 46. The portion 46 is larger than the portion 44. Also, the portions 46 and 44 project forwardly from the wall 42 so as to be positioned near the front wall 32. Further, between the wall 42 and the front wall 32 and near the opening 36 there is a block 48. The block 48 is longer than the opening 36 so that the block 48 is positioned between the wall 42 and the wall 32. Further, between the back of the block 48 and the wall 42 there is a spring 51 which urges the block 48 toward the opening 36 and the front wall 32. Also, the block 48 is wider than the opening 36 so that the spring will not be able to force or push the block 48 through the opening 36.

To repeat, in exposing the film in the camera, the film is unwound from that part of the spindle 38 between the divider 34 and the wall 24 so as to pass between part 44 and the wall 32, the block 48 and the wall 32 and also by the opening 36, and between that part 46 and the wall 32.

That part 44 and the wall 32 function as a light trap and that part 46 and the wall 32 function as a light trap. These light traps are necessary so as not to expose the film when it is daylight or in light.

An illustration of the unwinding of the film 50 from the shaft 38, past the opening 36, and on to the shaft 38 is generally depicted in FIGS. 7 and 8.

After the film has been exposed, it is necessary to remove the undeveloped film 50 from the film pack 20 so that the film can be developed. In removing the undeveloped film 50, it is necessary not to damage the film such as by scratching the film or tearing or breaking the film.

Prior to this invention, one of the ways that the film 50 was removed from the film pack 20 was to slice or cut the walls 26, 28, 30 and 32 so as to remove or fold back the sidewall 22 and then remove the spindle 38 and the film 50 from the film pack 20. This procedure had many shortcomings. One of these shortcomings was the expensive tool required to cut away the sidewall 22 from the main body of the container for the film pack 20. Remember, it is necessary to cut away the sidewall 22 without cutting or damaging or scratching the film 50. Further, to cut away the sidewall 22 necessitated the cutting away in the dark. Remember, at this stage, the film has not been developed but only exposed. Therefore, it was necessary to cut away the sidewall 22 in the dark. This was a time-consuming operation, and a good operator could remove approximately 80 rolls of film per hour from a film pack 20. Also, it was necessary to identify the film. The placing of proper identification on the film was done in the darkroom which again was a hindrance as working in the dark is much slower and much more tedious than working in the light. Finally, in removing the spindle 38 and the film 50 wound on the spindle 38, the chance of unraveling the film in the darkroom was considerable, and special care had to be taken to maintain the roll of film on the spindle 38.

With this background, I invented a method and an apparatus for removing film 50 from the film pack. Again, in removing the film 50 from the film pack it is necessary not to scratch or damage the emulsion on the film. To remove the film 50 from the film pack, I decided to break away that portion of the front wall 32 adjacent to the opening 36 and also adjacent to the movable block 48. This allows a large opening in the front wall 32 so that the film can be pulled out of the film pack 20 without touching the front wall 32 and also without touching the block 48 so as not be to scratched and damaged. Accordingly, an object of this invention is to provide a method which allows the film to be quickly removed from a film pack; a method which allows the film to be tagged for identification purposes in the light; to provide an apparatus which is relatively inexpensive for opening the film pack to allow the film to be removed; and, to allow the film, in the dark, to be transferred from the film pack for developing purposes.

These and other important objects and advantages of the invention will be more particularly brought forth upon reference to the accompanying drawings, the detailed description of the invention and the appended claims.

Figure 2:
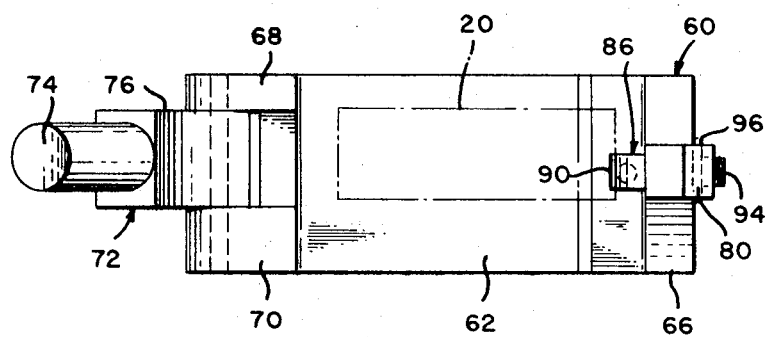
FIG. 2 is a plan view looking down on the invention.
Figure 1:
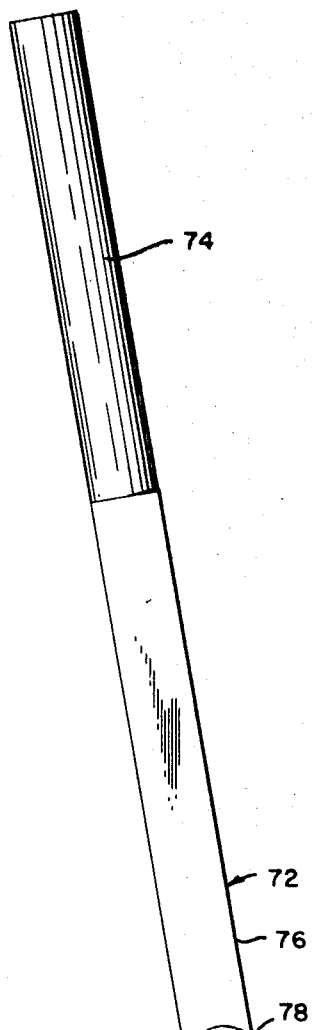
FIG. 1 is a side-elevational view of a specific embodiment of the invention constructed in accordance with the preferred teachings thereof and illustrates a wedge for insertion into the film pack for separation of a portion of the front wall of the film pack so as to allow the film to be removed from the film pack.
Figure 1:
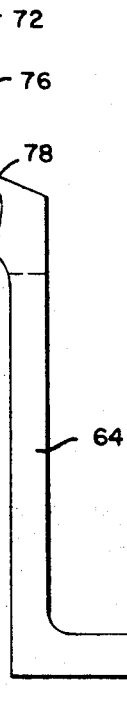
Figure 3:
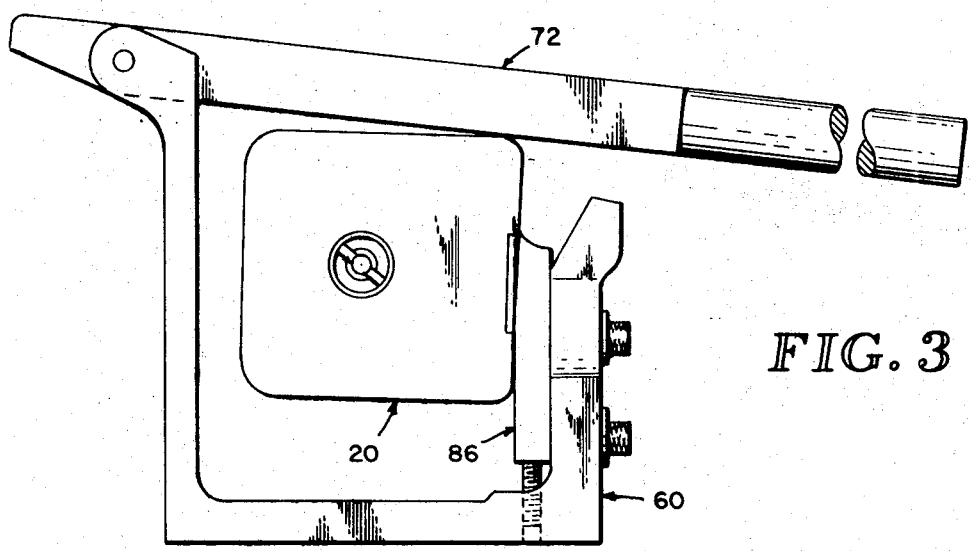
FIG. 3 is a side-elevational view illustrating the film pack as positioned on the wedge and the handle of the apparatus for forcing the film pack onto the wedge for tearing away part of the front wall of the film pack.
Figure 4:
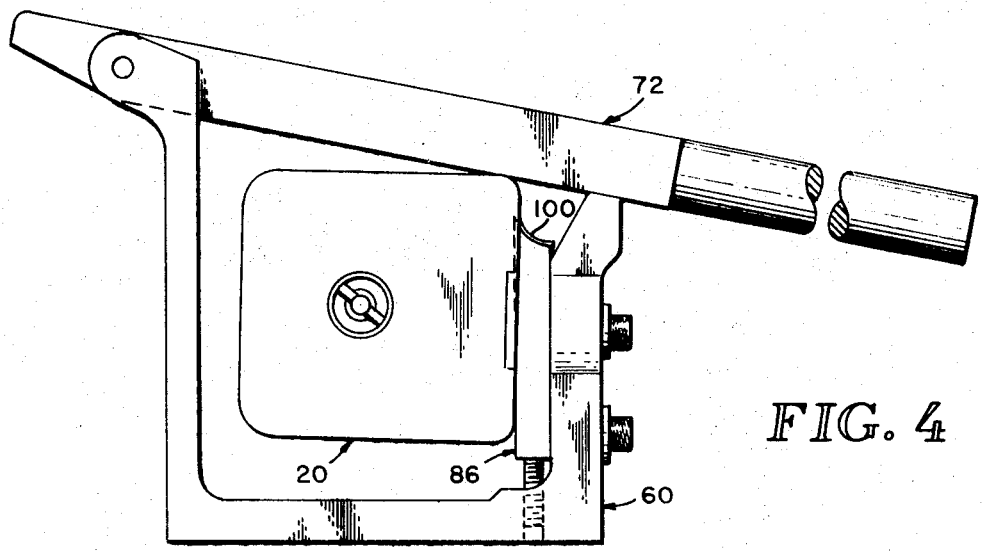
FIG. 4 is a side-elevational view of the invention and shows the film pack after it has been moved with respect to the wedge and after a portion of the front wall has been broken away.
Figure 5:
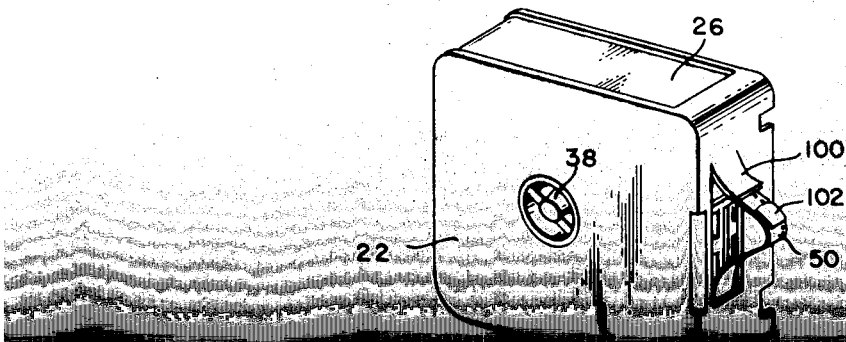
FIG. 5 is a perspective view looking at the film pack and shows a portion of the front wall broken away.
Figure 6:
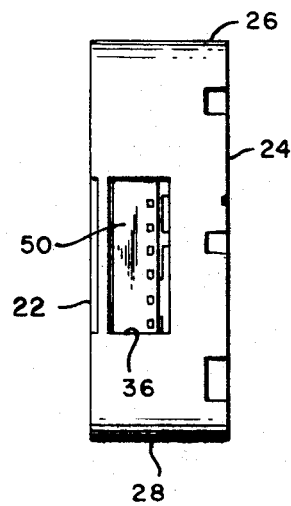
FIG. 6 is a front elevational view of the film pack and shows the film pack intact and with the front wall around the opening intact.
Figure 7:
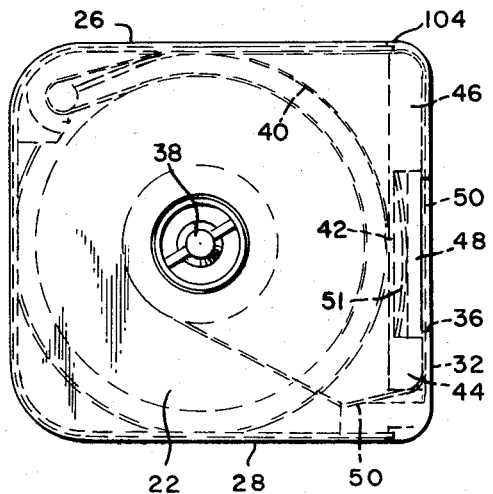
FIG. 7 is a side-elevational view of the film pack and shows the front wall around the opening of the film pack intact and also schematically shows details of part of the construction of the interior of the film pack.
Figure 8:
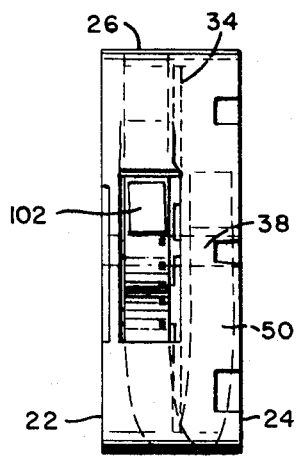
FIG. 8 is a front elevational view of the film pack after that portion of the front wall around the opening has been broken away.
Figure 9:
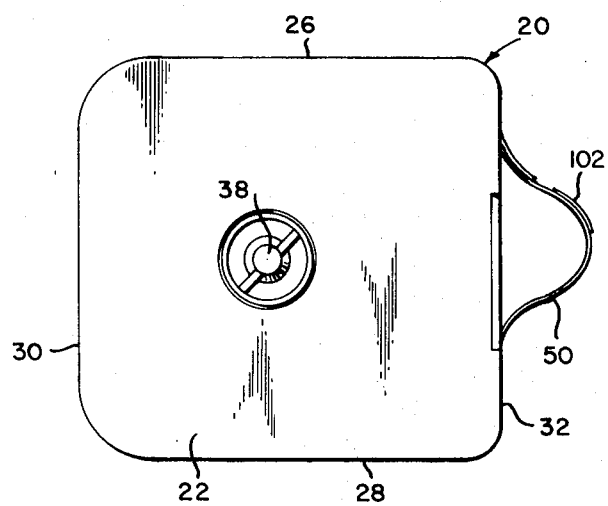
FIG. 9 is a side elevational view of the film pack and shows that portion of the front wall around the opening after it has been broken away and separated from part of the front wall.

With reference to FIGS. 1-4, it is seen that the invention comprises the opener 60. This opener comprises a base 62, a first leg 64 and a second leg 66. The leg 64 is integral with one end of the base 62 and the second leg 66 is integral with the other end of the base 62. The base 62 and the two legs 64 and 66 are of a unitary construction. In FIG. 1 it is seen that the base 62 and the two legs 64 and 66 are of a generally U-configuration.

The upper or outer end of the leg 64 is split into a clevis comprising two spaced-apart members 68 and 70. There are aligned passageways in the two members 68 and 70. There is a handle 72 which has a hand-gripping portion 74, on its outer end, and on its inner end a flat bearing surface 76. In the end of the handle, away from the hand-gripping portion 74, there is a passageway. That end of the handle near the passageway cofits with the spaced-apart members 68 and 70. By putting a pin 78 through the aligned passageways in the member 68 and 70 and also through the passageway in the handle 72, the handle 72 is free to rotate.

The second leg on its upper end projects outwardly and terminates in a stop 80. The central portion of the second leg 66 is cut away to define an opening 82. Further, in the base 62 and near the second leg 66 there is a tapped threaded passageway 84.

The second leg 66 functions as a guide and support for a wedge 86. The wedge 86 comprises a relatively long rectangular body 88 which on its upper end curves upwardly to a cutting edge 90.

In the body 88 of the wedge 86 there are two spaced-apart tapped passageways 92.

Two threaded bolts 94 pass through the passageway 82 in the legs 66 and screw into the tapped passageways 92 in the wedge 86. There is a washer 96 between the head of the bolts 94 and the surface of the leg 66 so that the head of the bolts 94 will not pass through the opening 82. In this manner, the wedge 86 can be positioned on the inner surface of the leg 66. Further, in the tapped passageway 84 there is a setscrew 98. By means of the setscrew 98 it is possible to vary the position of the wedge 86 on the leg 66. The bolts 94 can be loosened, the setscrew 98 adjusted to set the wedge 86 at a desired position, and then the bolts 94 tightened so as to securely position the wedge 86 on the inner surface of the leg 66.

In use the handle 72 of the opener 60 is rotated upwardly. Then, the film pack 20 is placed in the opener 60. More particularly, the film pack 20 is placed over the wedge 86 so that that portion of the front wall 32 near the opening 36, and above the opening 36 is resting on the cutting edge 90 of the wedge 86. Then, the handle 72 is rotated so that the bearing surface 76 is in contact with the upper edge 26 of the film pack 20. The operator bears down on the hand-gripping portion 74 and the wall 32 above the opening 36 breaks away as shown at 100 in FIG. 4. In this manner, the wall 32 is removed away from the part 46 and also away from the movable block 48. It is then possible to unwind the film 50 from the spindle 38 without the film 50 touching the wall 32 or the movable block 48. In this manner, the film 50 will not be scratched or damaged, and the emulsion on the film 50 will not be scratched or damaged or marred.

As is well known, the container for the film pack 20, and in particular the wall 32, is made of a plastic which can be readily cut and readily torn. It is conceivable that other material such as aluminum could be used for the front wall 32 in the film pack and that the aluminum could be separated or torn away from the wall 32 around the opening 36.

One of the advantages of this method and invention is the fact that the film 50 can be tagged for identification purposes at 102. This film 50 may be tagged at 102 prior to opening the film pack 20 or after the film pack 20 has been opened.

The film 50 wound on that portion of the spindle 38 between the divider 34 and the wall 22 will not be damaged because of light creeping into the film pack because of the flap 100 being opened and torn away from the rest of the wall 32 at as 104 there is a narrow passageway between the part 46 and the wall at the junction of the walls 26 and 32. With this light trap, the film 50 in the film pack 20 is protected.

From the foregoing it is seen that I have provided a method and an apparatus for quickly opening a film pack 20. It is possible to open a film pack 20 in the daylight and not in a darkroom. With this method and apparatus, and also with the ability to open in a lighted room, I can open 200 film packs per hour. This is a large increase over the number that can be opened with prior conventional apparatus. Further, after the film pack has been opened in a lighted room, it can be taken to a darkroom and the film 50 removed from the film pack and the film processed and developed.

I claim:

1. A method for opening a film pack comprising a container having a front wall and an opening in the front wall, a first means juxtapositioned to said front wall, and part of a roll of film between said wall and said first means, said method comprising:
    a. increasing the distance between the first means and the front wall to allow the film to move freely between the first means and the front wall, by inserting a wedge between said first means and said front wall, and
    b. separating part of the front wall adjacent to the opening and juxtapositioned to the first means from the adjacent part of the front wall by moving said wedge and said film pack relative to each other to increase the distance between the first means and the front wall.

2. An opener for opening a film pack, said film pack comprising a container having a front wall and an opening in the front wall, a first means juxtapositioned to said front wall, and part of a roll of film between said wall and said first means, said apparatus comprising:
    a. a wedge;
    b. said wedge being of less width than said opening in said front wall and for insertion in said opening and for insertion between the front wall and said film; and
    c. a second means to move the wedge and the film pack with respect to each other to separate that part of the front wall adjacent to the opening and juxtapositioned to the first means from the adjacent part of the front wall to increase the distance between the first means and the front wall.

3. An opener according to claim 2 and comprising:
    a. a supporting leg;
    b. a third means to mount the wedge on the supporting leg; and
    c. said second means comprising a handle for bearing down on the film pack.

4. An opener according to claim 2 and comprising:
    a. a base;
    b. a first leg integral with said base;
    c. a second leg integral with said base;
    d. in a side elevational view the base, the first leg and the second leg presenting a generally U-configuration;
    e. said second means being a handle having a bearing surface;
    f. a third means connecting the first leg and the handle to allow the handle to rotate with respect to the first leg; and
    g. a fourth means mounting said wedge on the second leg.

5. An opener for opening a film pack, said film pack comprising a container having a front wall and an opening in the front wall, a first means juxtapositioned to said front wall, and part of a roll of film between said wall and said first means, said apparatus comprising:
    a. a wedge;
    b. said wedge being of less width than said opening in said front wall and for insertion in said opening and for insertion between the front wall and said film;
    c. a second means to move the wedge and the film pack with respect to each other to separate that part of the front wall adjacent to the opening and juxtapositioned to the first means from the adjacent part of the front wall to increase the distance between the first means and the front wall;
    d. a base;
    e. a first leg integral with said base;
    f. a second leg integral with said base;
    g. in a side elevational view the base, the first leg and the second leg presenting a generally U-configuration;
    h. said second means being a handle having a bearing surface;
    i. a third means connecting the first leg and the handle to allow the handle to rotate with respect to the first leg;
    j. a fourth means mounting said wedge on the second leg; and
    k. said fourth means adjusting the position of the wedge with respect to the second leg.